(12) United States Patent
Virk

(10) Patent No.: US 8,450,969 B2
(45) Date of Patent: May 28, 2013

(54) SYSTEM FOR AUTOMATICALLY CHARGING ELECTRICALLY POWERED AUTOMATED GUIDED VEHICLES

(75) Inventor: Raman Virk, Hamilton (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 159 days.

(21) Appl. No.: 13/036,235

(22) Filed: Feb. 28, 2011

(65) Prior Publication Data

US 2012/0217927 A1   Aug. 30, 2012

(51) Int. Cl.
*H02J 7/00*   (2006.01)

(52) U.S. Cl.
USPC .......................................... 320/109; 320/104

(58) Field of Classification Search
CPC ....................................................... Y02T 90/14
USPC ................................................ 320/104, 109
See application file for complete search history.

(56) References Cited

U.S. PATENT DOCUMENTS

| | | | |
|---|---|---|---|
| 5,545,967 A | 8/1996 | Osborne et al. | |
| 5,712,795 A | 1/1998 | Layman et al. | |
| 6,498,454 B1 | 12/2002 | Pinlam et al. | |
| 6,504,344 B1 | 1/2003 | Adams et al. | |
| 2008/0218104 A1* | 9/2008 | Lukic et al. | 318/139 |
| 2011/0254504 A1* | 10/2011 | Haddad et al. | 320/109 |
| 2012/0019205 A1* | 1/2012 | Kressner et al. | 320/109 |

* cited by examiner

*Primary Examiner* — Edward Tso
*Assistant Examiner* — Ahmed Omar
(74) *Attorney, Agent, or Firm* — Gifford, Krass, Sprinkle, Anderson & Citkowski, P.C.

(57) ABSTRACT

A system for automatically charging electrically powered automated guided vehicles in which a unique identification tag is attached to each vehicle in the system. A reader is positioned to periodically read the tags on each vehicle as the vehicle passes near the reader. The reader then produces an output signal which identifies the vehicle as an input signal to a processor. The processor receives the signal from the reader and is programmed to determine if the vehicle is scheduled for an electrical recharging. If so, the processor generates an output signal to the vehicle to divert the vehicle to an electrical charging station. At the charging station, an electrical charger automatically engages electrodes on the vehicle to initiate and thereafter complete the electrical charge.

7 Claims, 2 Drawing Sheets

SYSTEM FOR AUTOMATICALLY CHARGING ELECTRICALLY POWERED AUTOMATED GUIDED VEHICLES

BACKGROUND OF THE INVENTION

I. Field of the Invention

The present invention relates to a system for automatically charging electrically powered automated guided vehicles.

II. Description of Related Art

Electrically powered automated guided vehicles are frequently used in factories, warehouses, and the like for transporting parts from one location and to another. These vehicles typically travel along predetermined routes in the facility to transfer their load from one point and to another.

Opportunity electrical chargers are usually provided at least one, and more typically several, locations in the facility to recharge the electrical batteries in the vehicles as required. These opportunity chargers typically perform a rapid charge of the batteries until the batteries attain approximately 80% of their maximum electrical charge. Such opportunity chargers are capable of recharging the vehicle batteries to about 80% of their total storage capacity in a manner of minutes.

In order to clean the batteries and to extend the life of the battery, however, the batteries must undergo a deep charge on a regular schedule, typically weekly. The deep charge usually requires several hours of charging the batteries and, at the end of the deep charge, the internal components of the battery are not only clean, but the battery is recharged to substantially 100% of its storage capacity.

In order to deep charge the electric batteries on such vehicles, it has been the previous practice to manually inspect the vehicles and manually divert the vehicles to a deep charging station whenever a deep charge for that particular electric vehicle is required. This procedure, however, is disadvantageous for at least two reasons. First, in order to conduct the deep charge of the batteries, it has been previously necessary for personnel to not only manually identify and divert the vehicles to a deep charging station, but to also remove the batteries from the vehicle and attach those batteries to the deep charger. Such a procedure is inherently labor intensive thus adding to the overall cost of periodically deep charging the vehicle batteries.

Secondly, since the entire deep charging operation is conducted manually by personnel, human error not only can, but almost certainly will, occur. Common human errors include the failure to timely select the vehicles for a deep charge as well as failure to properly conduct the deep charge for the vehicle batteries. In either case, shortened battery life will result thus necessitating premature replacement of the vehicle batteries. Such battery replacement, of course, is expensive to implement.

SUMMARY OF THE PRESENT INVENTION

The present invention provides a system for automatically charging electrically powered automated guided vehicles which overcomes all of the above-mentioned disadvantages of the previously known procedures.

In brief, in the present invention a unique identification tag, such as a barcode tag, is attached to each vehicle in the system. This tag is unique in the sense that each vehicle may be individually identified by the data contained on its associated tag.

A tag reader is positioned to read each tag on the vehicle as the vehicle is moved near the reader. Preferably, the reader is positioned along the path taken by the various vehicles in the system so that each vehicle passes near the tag reader on a frequent basis.

The reader, upon reading the identification tag, generates an output signal to a processor which maintains a deep charge schedule for each vehicle in the system. Consequently, upon reading the tag and identifying the vehicle, the processor is able to determine if that particular vehicle is scheduled for a deep charge.

If the vehicle is scheduled for a deep charge, the processor generates an output signal to the vehicle to divert the vehicle to a deep charge station. Once the vehicle is at a predetermined position within the deep charge station, the processor generates a signal to an actuator which moves a pair of charging electrodes from a retracted position in which the charging vehicles are spaced from the vehicle and to an extended position. In the extended position, the charging vehicles physically contact and engage vehicle electrodes on one side of the vehicle.

After the charging electrodes engage the vehicle electrodes, the processor initiates the deep charge operation. The deep charge operation extends over a predetermined period of time, typically several hours. Upon completion of the deep charging operation, the processor again moves the charging electrodes to their retracted position and thus away from the vehicle. The processor then releases the vehicle back into the system pathway for operation in the normal fashion.

Since the entire deep charging operation is automated, not only in the selection of the vehicles to undergo the deep charge operation, but also the deep charge operation itself, human error is effectively eliminated.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
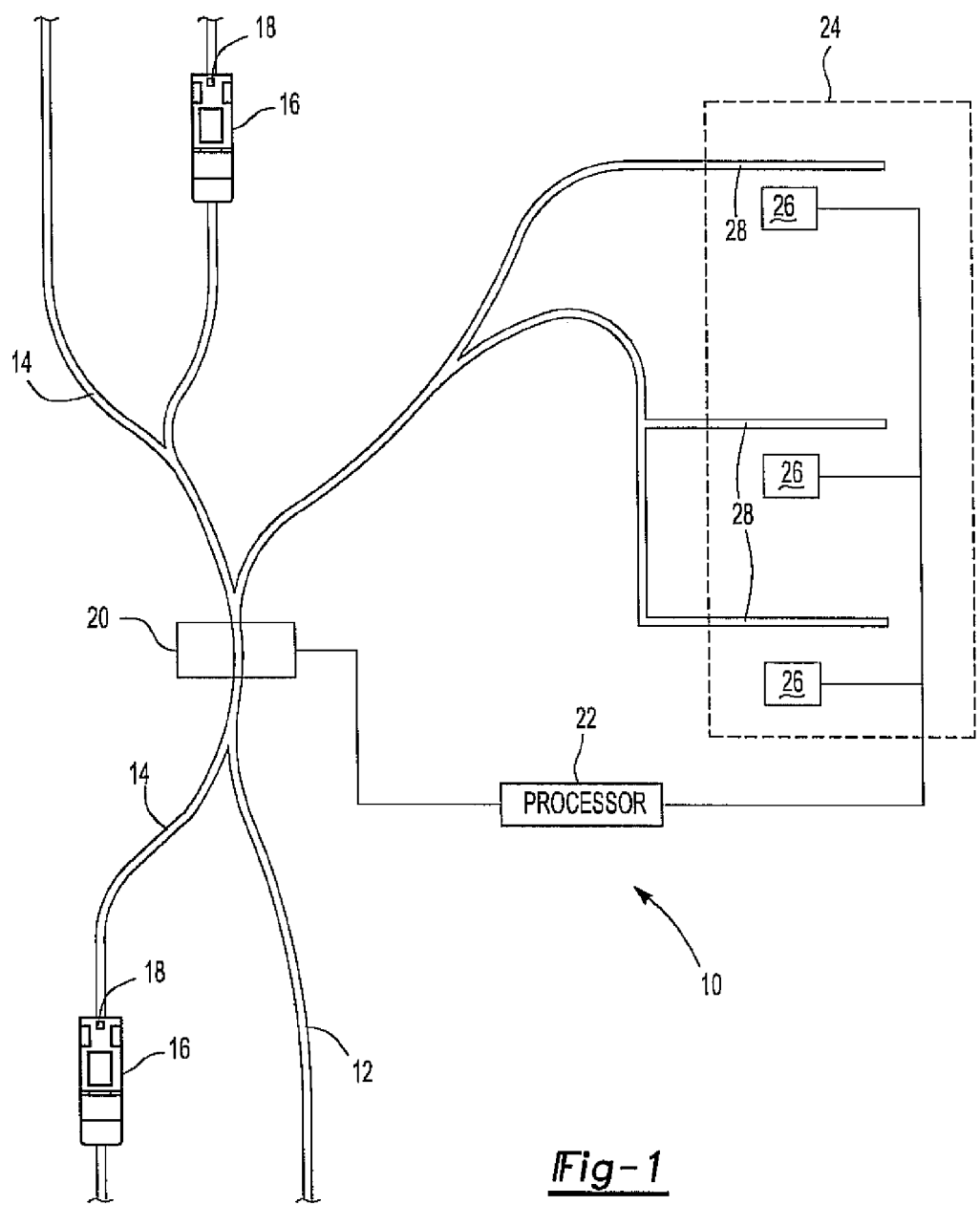
FIG. 1 is a top plan view diagrammatically illustrating a preferred system of the present invention.

With reference first to FIG. 1, a top view of a preferred embodiment of a system 10 in accordance with the present invention is illustrated. The system 10 includes a plurality of pathways 14, typically tracks, extending through a manufacturing facility, warehouse facility, or the like. These pathways 14, furthermore, define the path of travel of electrically powered automated guided vehicles 16. Although only two vehicles 16 are illustrated in FIG. 1, it will be understood that typically a greater number of vehicles 16 are present in the system. Furthermore, each vehicle 16 includes a conventional electronic control circuit 16 which controls the direction and path of operation of each vehicle 16.

A unique identification tag 18, such as a barcode, is attached to each vehicle 16. Since each identification tag 18 is unique to its particular vehicle 16, the data carried by each tag 18 on each vehicle 16 differs from the other tags 18.

A tag reader 20 is positioned along the pathway 14 such that the vehicles 16 periodically pass under the tag reader 20. Preferably, the tag reader 20 is positioned so that each vehicle 16 passes near the tag reader 20 on a frequent basis.

The tag reader 20 generates an electrical output signal to a programmed processor 22. In a fashion that will be shortly described in greater detail, the processor not only reads the identification tags 18 on each vehicle 16 as the vehicle 16 passes near the tag reader 20, but diverts the vehicle 16 to a deep charging station 24 in the event that that particular vehicle is scheduled for deep charging.

Still referring to FIG. 1, the deep charging station 24 includes at least one, but preferably several deep chargers 26. Each deep charger 26, furthermore, is positioned adjacent a section 28 of the vehicle pathway 14.

Figure 2:
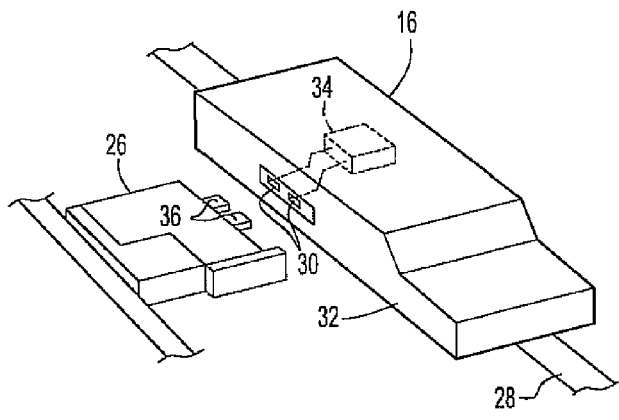
FIG. 2 is an elevational view illustrating one vehicle at a deep charging station.

With reference now to FIG. 2, each vehicle 16 includes a pair of vehicle electrodes 30 along one side 32 of the vehicle 16. These vehicle electrodes 30 are electrically connected to the vehicle battery 34 contained in or on the vehicle 16.

Each deep charging station 26 includes a pair of charging electrodes 36 that are spaced apart from each other by the same distance as the vehicle electrodes 30. Consequently, when the vehicle 16 is positioned at a predetermined position ready for a deep charge, the vehicle electrodes 30 are aligned with the charger electrodes 36.

Figure 3A:
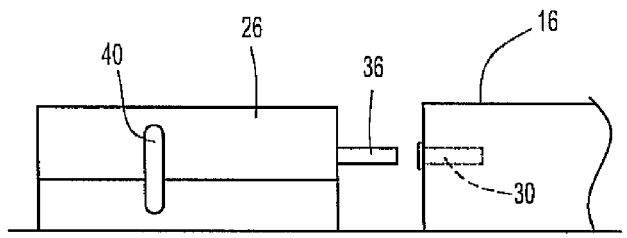
FIG. 3A is a front view illustrating a vehicle at the deep charging station and with the deep charger electrodes in a retracted position.
Figure 3B:
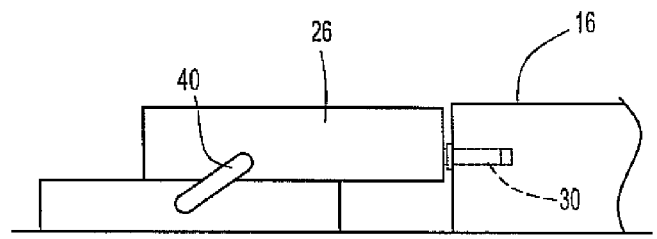
FIG. 3B is a view similar to FIG. 3A, but illustrating the charger in an extended position.

With reference now to FIGS. 3A and 3B, the vehicle 16 is illustrated in FIG. 3A in a position ready for a deep charge. As such, the charger electrodes 36 are aligned with their respective vehicle electrodes 30. As shown in FIG. 3A, the charger 26 is in its retracted position in which its electrodes 36 are spaced from the vehicle electrodes 30.

With reference now to FIG. 3B, the processor 22 (FIG. 1) then generates a control signal to an actuator 40 at the deep charger 26. Upon receipt of the control signal, the actuator 40 moves the charger 26 to its extended position, illustrated in FIG. 3B, so that the charger electrodes 36 physically engage and are electrically connected to the vehicle electrodes 30. The processor 22 then initiates the deep charging operation.

Upon completion of the deep charging operation, the processor 22 again generates an output signal to the actuator 40 to return the charger 26 to its retracted position shown in FIG. 3A. The vehicle 16, now fully charged, is then released back into the pathway 14 of the system 10.

Figure 4:
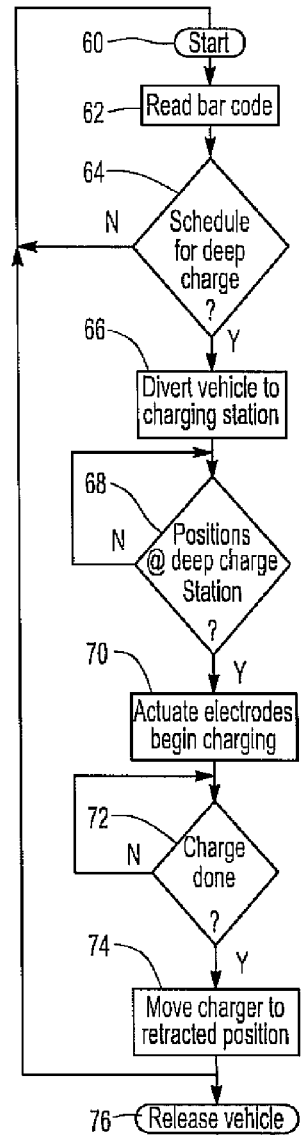
FIG. 4 is a flowchart illustrating the operation of the present invention.

With reference now to FIG. 4, the operation of the processor 22 is illustrated. After the processor program starts at step 60, step 60 proceeds to step 62. At step 62, the processor 22 reads the identification tag 18 from the vehicle 16 to identify the vehicle 16. Step 62 then proceeds to step 64.

At step 64 the processor 22 determines if the vehicle is scheduled for a deep charge. If not, step 64 branches back to step 60 where the above process is repeated. Otherwise, step 64 proceeds to step 66.

At step 66 the processor 22, having determined that the vehicle is scheduled for a deep charge, diverts the vehicle 16 to the deep charge station 24. Step 66 then proceeds to step 68.

At step 68, the processor 22 determines if the vehicle 16 is properly positioned in the deep charge station next to one of the chargers 26. If not, step 68 merely branches back on itself. However, when the vehicle 16 is properly aligned with the deep charger 26, i.e. the charger electrodes 36 are properly aligned with the vehicle electrodes 30, step 68 proceeds to step 70.

At step 70, the processor 22 generates an output signal to the charger actuators 40 to move the charger 26 from its retracted position, illustrated in FIG. 3A, and to its extended position, illustrated in FIG. 3B. Step 70 then initiates the charging operation and then proceeds to step 72.

The deep charging operation takes a predetermined period of time, typically several hours. Step 72 determines if that time period has expired. Once the time period expires, step 72 proceeds to step 74 whereupon the processor generates an output signal to the charger actuators 40 to move the charger 26 to its retracted position shown in FIG. 3A. Step 74 then proceeds to step 76 whereupon the processor 22 releases the vehicle 16 back into the pathway 14 of the system.

Although the present invention has utilized a barcode as the identification on the identification tag 18, it will be understood that different types of identification tags 18 may be alternatively used without deviation from the spirit or scope of the invention. For example, the identification tag 18 could comprise, for example, an RFID tag or other type of identification tag.

From the foregoing, it can be seen that the present invention provides a simple and yet highly effective system for automatically deep charging electrically powered automated electric vehicles which eliminates the possibility of human error in the charging procedure. Having described my invention, however, many modifications thereto will become apparent to those skilled in the art to which it pertains without deviation from the spirit of the invention as defined by the scope of the appended claims.

I claim:

1. A system for automatically charging electrically powered automated guided vehicles comprising:
   an electrical recharging station,
   a unique identification tag attached to each vehicle in the system,
   a reader positioned to read each tag on each vehicle as each said vehicle passes near said reader, said reader producing a first output signal which identifies the vehicle,
   a processor which receives said signal from said reader, said processor programmed to determine if the vehicle is scheduled for electrical recharging and, if so, generates a second output signal to said vehicle to divert said vehicle to said recharging station.

2. The system as defined in claim 1 wherein said tag is barcode tag and wherein said reader comprises an optical scanner.

3. The system as defined in claim 1 wherein said electrical recharging station comprises a deep charge recharging station.

4. The system as defined in claim 1 wherein said vehicle comprises a pair of vehicle electrodes on one side of the vehicle and said electrical charging station having a pair of charging electrodes movable between an extended position in which said charging electrodes engage said vehicle electrodes and a retracted position in which said charging electrodes are retracted away from said vehicle electrodes, and an actuator for selectively moving said charging electrodes between said extended and said retracted positions.

5. The system as defined in claim 4 wherein said processor is programmed to selectively actuate said charging electrodes between said retracted and said extended positions.

6. The system as defined in claim 5 wherein said processor is programmed to retain said charging electrodes in said extended position for a predetermined time period while charging a vehicle.

7. The system as defined in claim 6 wherein said processor is programmed to actuate said actuator to said retracted position at the end of said predetermined time period and thereafter release said vehicle from said charging station.

\* \* \* \* \*